G. S. BAILEY & H. POOL.
Car-Starter.

No. 165,052.  Patented June 29, 1875.

WITNESSES:
P. C. Dieterich.
N. C. McArthur.

INVENTORS
G. S. Bailey
Harris Pool
per
F. E. Alexander
ATTORNEY.

UNITED STATES PATENT OFFICE.

GILBERT S. BAILEY, OF CHICAGO, ILLINOIS, AND HARRIS POOL, OF MONROE, WISCONSIN.

IMPROVEMENT IN CAR-STARTERS.

Specification forming part of Letters Patent No. 165,052, dated June 29, 1875; application filed March 9, 1875.

*To all whom it may concern:*

Be it known that we, GILBERT S. BAILEY, of Chicago, Illinois, and HARRIS POOL, of Monroe, Wisconsin, have invented a Car-Starter, of which the following is a specification:

The nature of our invention consists in the combination of certain devices, which will be hereafter set forth and claimed.

Figure 1:
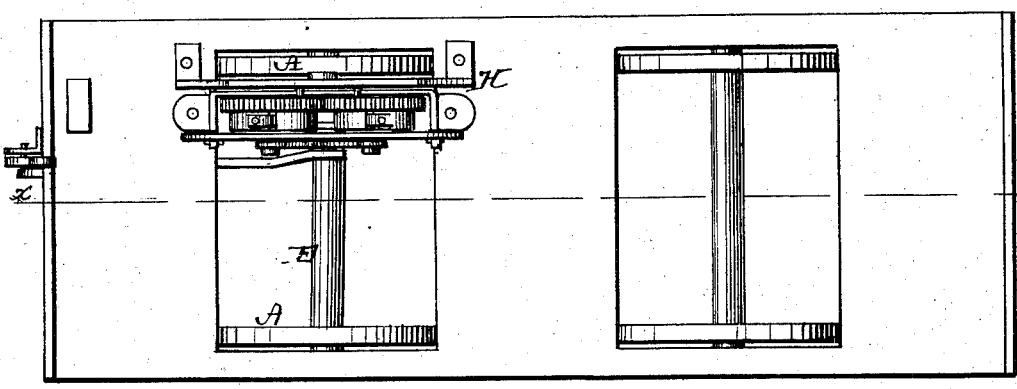
Figure 2:
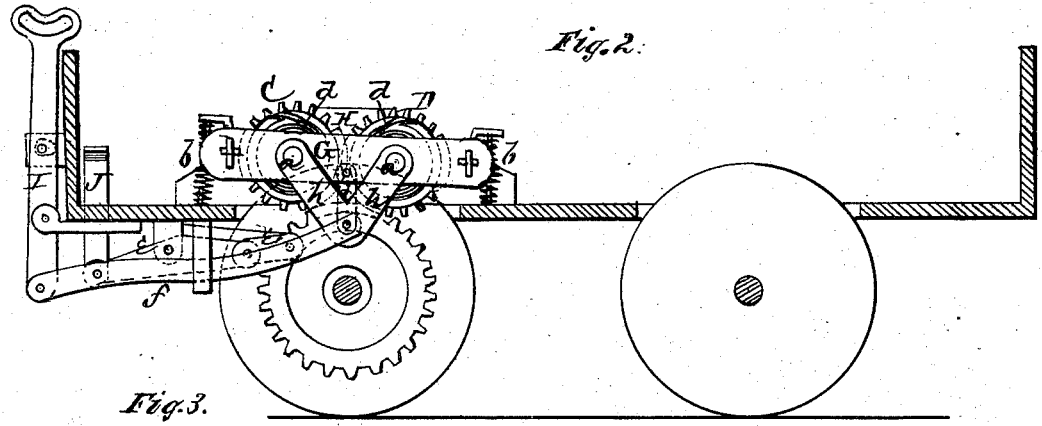
Figure 3:
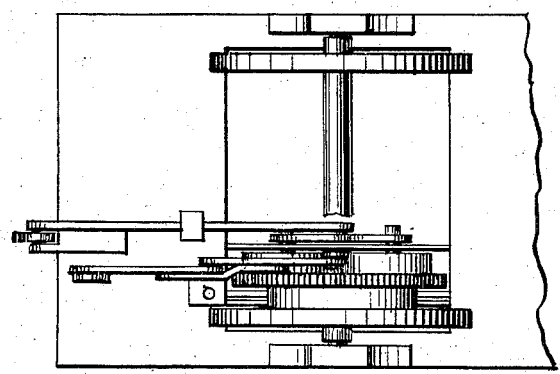
Figure 4:
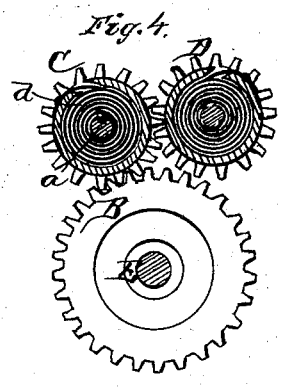

In the annexed drawing, Figure 1 is a plan view of a car embodying our invention. Fig. 2 is a longitudinal vertical section of the same. Fig. 3 is a bottom view of the same. Fig. 4 is a detailed view of a part thereof.

A A represent the car-wheels secured on the axle E. B is a cog-wheel attached to one of the car-wheels A or to the axle. C and D are cog-wheels mounted upon axles or arbors $a\,a$ in a frame, G, and meshing into each other and into the cog-wheel B, when required.

The frame G is supported at each end by a spiral spring, $b$, which raise the frame sufficiently to throw the cog-wheels C D out of gear with the cog-wheel B. The center of the frame has a headed pivot passing through a slot in stand H on the car-frame, so that the frame can move up and down, and also tilt to either end. The cog-wheels C D are formed like hollow casings, each containing a coiled spring, $d$, of sufficient power to start the car by its reaction. Each spring is, at its inner end, formed with a catch to hook on a projection on the arbor $a$, and these parts are of such construction that when the cog-wheel turns in one direction, the spring will be wound up; but when turned in the opposite direction, the spring will slide freely around the arbor without breaking.

At the front of the dash-board of the car is pivoted a lever, I, the lower end of which is, by a rod, $f$, connected with the lower ends of two arms, $h\,h$, projecting downward from the frame G, one on each side of the center pivot.

At the front end of the car is also a foot-lever, J, connected by pivoted links $e\,e$ with an arm, $i$, depending from the center of the frame G.

The operation of our machine is as follows:

When not in use the cog-wheels C D are entirely disconnected from the cog-wheel B, so that the car can move freely either forward or backward. When it is desired to stop the car, the lever I is drawn toward the driver. This brings the cog-wheel D into gear with the wheel B, and as the car moves forward the springs within both wheels are wound up until it stops the car.

To start the car, the driver presses his foot on the foot-lever J, and at the same time releases the lever I. This brings the wheel C also in gear with the wheel B. By now thrusting forward the lever I, the wheel D is released, while the wheel C is still in gear with the same, and the reaction of the springs $d\,d$ sends the car forward in the same direction as it was moving before it stopped.

After the car is started, the wheels C D should be released from the wheel B; but if this is not done, no harm will follow, as the springs, after their reaction, will slip freely around their arbors.

The same device will stop or start the car when going the other way by simply reversing the action of the wheels C and D, they being then operated by the conductor.

If it is required to stop the car suddenly, the foot-lever J is pressed down, bringing both wheels C and D into gear with the wheel B, and thus preventing the axle from turning.

Having thus fully described our invention, what we claim as new, and desire to secure by Letters Patent, is—

In combination with the movable frame G, carrying the cog-wheels C D, the lever I, connecting-rod $f$, arms $h\,h$, foot-lever J, links $e\,e$, and arm $i$, all constructed and arranged to operate substantially as and for the purposes herein set forth.

In testimony that we claim the foregoing as our joint invention, we have hereunto affixed our hands and seals.

GILBERT S. BAILEY. [L. S.]
HARRIS POOL. [L. S.]

Witnesses:
FRANKLIN GILMORE,
J. E. ALDRIDGE.